(12) United States Patent
Nielsen

(10) Patent No.: US 11,174,838 B2
(45) Date of Patent: Nov. 16, 2021

(54) CONTROL METHOD FOR A WIND TURBINE

(71) Applicant: VESTAS WIND SYSTEMS A/S, Aarhus N (DK)

(72) Inventor: Johnny Nielsen, Svenstrup J (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 52 days.

(21) Appl. No.: 16/337,842

(22) PCT Filed: Sep. 27, 2017

(86) PCT No.: PCT/DK2017/050312
§ 371 (c)(1),
(2) Date: Mar. 28, 2019

(87) PCT Pub. No.: WO2018/059641
PCT Pub. Date: Apr. 5, 2018

(65) Prior Publication Data
US 2020/0032770 A1    Jan. 30, 2020

(30) Foreign Application Priority Data

Sep. 29, 2016 (DK) .............................. PA201670770

(51) Int. Cl.
*F03D 7/02* (2006.01)
*G01P 13/02* (2006.01)
*G01P 5/00* (2006.01)

(52) U.S. Cl.
CPC ......... *F03D 7/0224* (2013.01); *F03D 7/0204* (2013.01); *G01P 13/02* (2013.01); *G01P 5/00* (2013.01)

(58) Field of Classification Search
CPC ........ F03D 7/00; F03D 7/0204; F03D 7/0208; F03D 7/0212; F03D 7/0224; F03D 7/04;
(Continued)

(56) References Cited

U.S. PATENT DOCUMENTS 8,476,780 B2 * 7/2013 Hashimoto ........... F03D 7/0204
290/44
2009/0021015 A1 * 1/2009 Pedersen ............... F03D 7/0292
290/44
(Continued)

FOREIGN PATENT DOCUMENTS

CN    104481804 A    4/2015
CN    105464903 A    4/2016
(Continued)

OTHER PUBLICATIONS

"PID controller" [online]. Wikipedia, Jun. 26, 2015 [retrieved Sep. 19, 2020], Retrieved from the internet: <URL: https://en.wikipedia.org/wiki/PID_controller> (Year: 2015).*
(Continued)

*Primary Examiner* — Christopher Verdier
*Assistant Examiner* — Elton K Wong
(74) *Attorney, Agent, or Firm* — Patterson + Sheridan, LLP

(57) ABSTRACT

The invention relates to a method of controlling a wind turbine comprising a wind direction sensor, a yawing system, and a control system for yawing the wind turbine rotor relative to the wind. The method comprises obtaining an estimate for a wind power parameter as a function of a relative wind direction, where the wind power parameter is determined as one of a power, a torque, a blade load, or a blade pitch angle of the wind turbine. At time intervals, a data set is established comprising a wind power parameter and a wind direction parameter as measured by the wind direction sensor. Over time a group of data sets is then obtained for a number of pre-defined wind direction intervals, and a wind direction offset is determined for each interval by comparing the average wind power parameter for that interval with the estimate of the wind power parameter. The wind direction offsets of the different wind direction (Continued)

intervals are used to adjust the wind direction parameter, and applied in the controlling of the wind turbine. The invention further relates to a control system for a wind turbine for performing a control method as mentioned above.

14 Claims, 5 Drawing Sheets

(58) Field of Classification Search
CPC .......... F03D 7/043; F03D 7/044; F03D 7/045; G01P 13/02; G01P 5/00
See application file for complete search history.

(56) References Cited

U.S. PATENT DOCUMENTS

| | | | | |
|---|---|---|---|---|
| 2010/0329842 | A1* | 12/2010 | Stiesdal | F03D 7/0204 415/4.1 |
| 2015/0354532 | A1* | 12/2015 | Nielsen | F03D 13/25 416/9 |
| 2017/0184073 | A1* | 6/2017 | Ruiz Aldama | F03D 7/042 |
| 2017/0284375 | A1* | 10/2017 | Nielsen | G01P 13/02 |
| 2019/0107100 | A1* | 4/2019 | Brorsen | F03D 7/0204 |

FOREIGN PATENT DOCUMENTS

| | | |
|---|---|---|
| CN | 105484939 A | 4/2016 |
| CN | 105545596 A | 5/2016 |
| CN | 105569921 A | 5/2016 |
| CN | 105569922 A | 5/2016 |
| EP | 2154362 A1 | 2/2010 |
| EP | 2375060 A1 | 10/2011 |
| EP | 2918827 A1 | 9/2015 |
| EP | 3228862 A1 | 10/2017 |
| WO | 2013117470 A1 | 8/2013 |
| WO | 2015047148 A2 | 4/2015 |
| WO | 2016058115 A1 | 4/2016 |
| WO | 2016086778 A1 | 6/2016 |
| WO | 2016119795 A1 | 8/2016 |
| WO | 2018059641 A1 | 4/2018 |

OTHER PUBLICATIONS

Chinese Office Action for Application No. 201780073533.4 dated Mar. 17, 2020.
PCT Written Opinion of the International Searching Authority for Application No. PCT/DK2017/050312 dated Dec. 13, 2017.
PCT International Search Report for Application No. PCT/DK2017/050312 dated Dec. 13, 2017.
Danish Patent and Trademark Office First Technical Examination of Application No. PA 2016 70770 dated Mar. 24, 2017.
Intellectual Property India, First Examination Report for Application 201917013780, dated May 28, 2021.

* cited by examiner

CONTROL METHOD FOR A WIND TURBINE

FIELD OF THE INVENTION

The present invention relates to a method of controlling a wind turbine, the wind turbine comprising a wind direction sensor, a yawing system, and a control system for yawing the wind turbine rotor relative to the wind with the aim of controlling the wind turbine optimally under different and changing wind directions. The invention furthermore relates to control system for performing the control method and a wind turbine comprising such control system.

BACKGROUND

Most modern wind turbines are controlled and regulated continuously with the purpose of ensuring maximum power extraction from the wind under the current wind and weather conditions, while at the same time ensuring that the loads on the different components of the wind turbine are at any time kept within acceptable limits.

In order to optimize the power production and reduce the loads of the turbine it is important to know the right relative wind direction of the free flow wind. Most often the wind direction is measured by a wind direction sensor such as a wind vane placed on top of the nacelle and the wind turbine rotor is then continuously yawed to face the wind. If the wind direction measurements are off even by one or a few degrees, the resulting misalignment of the turbine rotor may cause increased and different loadings on the wind turbine blades than anticipated, and thereby increased wear and fatigue on the blades, blade root connections, bearings etc. Further, a misalignment of the turbine rotor causes a non-negligible reduction in the power production over time.

The measurements from a wind direction sensor may however far from always be accurate for one reason because the rotor disturbs the free flow wind before reaching the wind sensor.

One way to compensate for this problem is by calibrating the wind vane measurements by a basic set of offset parameters. These parameters are typically found on a prototype turbine by comparing the measurements from the wind sensors on the turbine with measurements from a nearby Met Mast. Hereby the wind vane is calibrated such that the wind vane detects a relative wind direction of 0 degrees when the nacelle is turned directly up against the wind.

However, it has surprisingly been found that a wind sensor calibrated in this way is still not always accurate in that the wind directions different from 0 degrees may still be measured inaccurately. In other words, the wind direction sensor may still show an error in the relative wind direction measurement when the wind turbine is not pointing directly upwind. Further, this error in the wind direction measurements has been seen to not simply be off by a constant value, but to be off by a value depending on the rotor operation (and thereby depending on the wind speed), and by a parameter depending on how and from where the wind passes the rotor.

For some turbines and seemingly occasioned by an increased rotor size, this error has been seen to be even more pronounced. In case the wind direction sensor measures too high values of the relative wind directions, such error may cause the wind turbine to yaw back and forth on either side of the actual wind direction. In addition to the non-optimal controlling of the wind turbine, such yawing causes highly increased wear on the yawing components in addition to the non-optimal positioning of the rotor in the wind.

To correct for this effect it has been proposed to use a nearby reference measurement like a METmast or LIDAR and then compare the relative wind direction given by the reference with the measurement from the wind direction sensors behind the rotor. The measured wind direction can then be corrected by making a transfer function between the measured wind direction by the wind sensors on the turbine and the reference measurement. It has however been found that such transfer function is very dependent on the turbine type and on the rotor size. There may further even be variations from turbine to turbine and from site to site. Generating such transfer function is therefore both very time consuming and expensive as it requires a nearby METmast or a LIDAR for all the different variants of wind turbines.

OBJECT OF THE INVENTION

It is an object of embodiments of the present invention to provide a control method for a wind turbine which obviate or reduce some of the above mentioned problems in known control methods.

It is therefore an object of embodiments of the present invention to overcome or at least reduce some or all of the above described disadvantages of the known wind direction measurements by providing a wind turbine controlling method of improved yawing and reduced risk of misalignment of the wind turbine rotor.

A further object is to establish wind direction correction parameters without the need for measurements from any nearby METmast or a LIDAR.

It is a further object of embodiments of the invention to provide a method of improving the wind direction measurements obtained by conventional wind direction sensors and to provide a method of calibrating measurements from a wind direction sensor which may be implemented on existing equipment.

It is a further object of the invention to provide a control method for a wind turbine increasing the annual energy production (AEP) of the wind turbine while preferably reducing the fatigue loading or wear on the turbine due to misalignment of the rotor in the wind or unnecessary yawing.

So, in a first aspect the present invention relates to a method of controlling a wind turbine, the wind turbine comprising at least one wind direction sensor for measuring a wind direction parameter indicative of the wind direction relative to the wind turbine, a number of pitch-adjustable rotor blades, a yawing system, and a control system for yawing the wind turbine rotor relative to the wind and for changing the pitch of the rotor blades and/or a generator torque, the method comprising:

obtaining an estimate for a wind power parameter as a function of a relative wind direction, where the wind power parameter is determined as one of a power, a torque, a blade load, or a pitch angle of the wind turbine;

obtaining a number of pre-defined wind direction intervals;

obtaining at time intervals a data set comprising a wind power parameter and a wind direction parameter as measured by the wind direction sensor;

obtaining over time a group of data sets for each wind direction interval;

determining for each wind direction interval and for each group of data sets an average wind power parameter;

determining for each wind direction interval and for each group of data sets a wind direction offset by comparing the average wind power parameter with the estimate of the wind power parameter;

adjusting the wind direction parameter as a function of the wind direction offsets of the different wind direction intervals, and applying the adjusted wind direction parameter in the controlling of the wind turbine.

Hereby is obtained an effective control method improving the yawing of the wind turbine and reducing the risk of misaligning the rotor relative to the wind, as the yawing is based on more accurate information on the wind direction. This is obtained by the adjusting of the measured wind direction by the wind direction offset. Hereby any rotor effects on the wind direction sensor are accounted for and an accurate wind direction measurement is obtained also when the wind is not coming directly in front.

Furthermore, the proposed method for determining the offsets for adjusting the measured wind direction can be made adaptive, so that the wind direction offsets can be determined and re-determined automatically on the wind turbine during operation and without the need for reference measurements on MET masts or the like.

By the proposed method is obtained a simple and effective control method for increasing the performance such as the annual energy production (AEP), as the yawing is adjusted to obtain a better alignment of the rotor to the wind as actually experienced by the rotor. Also, the wind turbine is better protected as a more precise alignment of the rotor to the free wind generally results in better control of the loads on the wind turbine blades and reduced wear on components. Further, the improved accuracy of the wind direction measurements especially of wind directions at an angle to the rotor reduces the risk of overcompensating the yawing having the rotor yawing too much in each yaw step.

It has been found that the wind direction measurements used to determine the optimal orientation of the wind turbine can advantageously be adjusted based on an offset according to the proposed method. The wind direction offsets are determined by observing over time the wind power parameter obtained by the turbine at different relative wind directions thereby establishing a histogram of the produced or realized wind power parameter as a function of the measured relative wind direction. This function is then compared to the expected wind power function as a function of the relative wind direction. The wind direction offset is then established as the difference between the relative wind directions as measured and as expected based on the realized wind power parameter. The algorithm makes such comparisons for each pre-defined wind direction interval thereby establishing a set of wind direction offsets to adjust the measured wind direction not necessarily with a constant value, but rather differently over the range of measured directions. The wind direction offsets determined according to this method have proven to be a good and effective measure for the most often non-constant measurement inaccuracy of the wind direction sensor caused by the rotor effects on the wind flow and taking into account and capturing that the rotor affects the wind flow differently at different relative wind directions. In other words, the wind direction offsets effectively act to compensate for the error or inaccuracy of the relative wind direction measurement when the turbine is not pointing directly upwind and for the free wind flow having been changed by the rotor in dependence on the relative wind direction.

The proposed control method wherein the measured wind parameter is adjusted has been seen to yield a more robust and stable control method where the risk of unintentional yawing or abrupt switching between different yaw positions has been significantly reduced or even removed. In this way, the earlier mentioned problem of switching between too large positive and negative yaw directions on either side of the wind direction, which has been seen to occur on some rotor types due to the rotor somehow affecting the wind flow to be measured at the wind sensor position as higher than the free wind, has been seen to be avoided. This effect is obtained because the adjusting of the measured wind direction takes into account how the rotor influences the wind flow and thereby the sensor measurements when the rotor is not pointing directly upwind.

The wind power parameter is determined as either the wind turbine power or a torque or a blade load or a pitch angle of the wind turbine which parameters all reflect the energy extracted from the wind by the wind turbine. The wind turbine power may advantageously be determined as the produced power or the grid output power which is easily detected, or as the generator power. The torque may be determined for example on the main shaft, and may be measured or determined from other wind turbine parameters as known in the field. The blade loads may be determined as a blade root moment or as an average of the blade root moments or as measured from sensors such as strain gauges or optical sensors placed on one or more of the blades. The pitch angle is advantageous as a wind power parameter in the full load production, where the wind turbine produces nominal power or more. Here, the blades are generally pitched to maintain power while at the same time reducing the loads on the wind turbine structure. The blade pitch thereby reflects the energy extracted from the wind by the wind turbine.

The estimate of a wind power parameter as a function of the relative wind direction may be obtained as a function expressing how the wind power parameter is expected to be for a given wind turbine type and at a given type of site. Such estimate may for example be established from data on other wind turbines of the same type, from numerical simulations, or from earlier data on the same wind turbine.

As an example, the wind turbine power can be estimated as a function of $\cos^x$ to the angle of the incoming wind, where x may depend on the wind turbine type. Indeed, it has been found by the inventors, that the power of some types of wind turbines is well described by a $\cos^3$ function. The function can for instance be determined by using an external wind direction measurement that is not affected by the rotor and compare it with the measured power. This could be a LIDAR a METMAST or other measurement equipment that is unaffected or limited affected by the rotor.

The wind turbine torque can be estimated in a similar way to the power. The torque may as examples be described as a $\cos^x$ function to the angle of the incoming wind, with x being in the range of 2-4. The blade load may be estimated by a polynomial function of the relative wind direction y, such as for example $ay^2+b$ where "a" and "b" are constants.

The estimate of a wind power parameter as a function of the relative wind direction may be obtained as a function expressing how the wind power parameter is expected to be for a given wind turbine type and at a given type of site. Such estimate may for example be established from data on other wind turbines of the same type, from numerical simulations, or from earlier data on the same wind turbine. As an example, the wind turbine power can be estimated as a function of $\cos^x$ to the angle of the incoming wind, where x may depend on the wind turbine type. Indeed, it has been found by the inventors, that the power of some types of wind turbines is well described by a $\cos^3$ function. The function can for instance be determined by using an external wind direction measurement that is not affected by the rotor and compare it with the measured power. This could be a LIDAR a METMAST or other measurement equipment that is unaffected or limited affected by the rotor.

More estimates may be used, for example for different seasons, for different weather conditions etc., or may be updated with data from other turbines or by its own data, from improved numerical simulations, or the like.

A number of pre-defined wind direction intervals are obtained, and for each wind direction interval the average wind direction offset is determined. Hereby is obtained a number of wind direction offsets as a function of the measured relative wind direction. The wind direction parameter is then adjusted as a function of the wind direction offsets. In one embodiment the wind direction parameter is simply adjusted as a function of the offset of the wind direction interval comprising the wind direction parameter at the time of adjusting. In this way is accounted for the wind flow being changed by the rotor differently in dependence on its direction when hitting the rotor. As mentioned, the adjustment according to this method have proven to be a good and effective means for the reducing or compensating for the inherent inaccuracy of the wind direction sensor measurements primarily caused by the free flow of the wind being changed by the rotor.

The predetermined intervals for the wind direction are preferably successive intervals but some may alternatively in an embodiment be partially overlapping. The intervals may be determined for example with a view to the dependency of the wind direction misalignment to the relative wind direction, such that smaller intervals are set in regimes where the wind direction correction changes more.

In an embodiment, 2, 3, 4, 5, 6, 7, or 8 different groups of data sets are made based on wind direction parameters within 2, 3, 4, 5, 6, 7, or 8 wind direction intervals, respectively. The more intervals the more refined the wind direction adjustment may be. The wind direction intervals may for example comprise the intervals from −15 to +15 degrees with steps of e.g. 3 degrees.

At time intervals, a data set is obtained, the data set comprising a wind power parameter and the wind direction parameter indicative of the wind direction relative to the wind turbine. The data sets may be obtained at time intervals of fixed length such as every minute, a number of times every second or every minute, every hour or every day. Preferably a data set is obtained at each sample such as several times per second. Short intervals are advantageous in reducing the risk of obtaining the data during a yaw operation where the data may in some cases potentially be cluttered.

The wind direction offset of each wind direction interval is based on a group of data sets i.e. from a number of data sets from different relative wind directions within each wind direction interval. The groups of data sets are obtained over time such as over a predetermined time period such as over a number of days, a week, or a month. Additionally or alternatively, the groups of data sets are obtained over time such that a predetermined number of data sets are in each group. In this way the wind direction offset is determined based on a larger and certain amount of data and determined more accurate and with a higher degree of certainty.

For each wind direction interval is determined the average wind power parameter based on the group of data obtained for that interval. The average wind power parameter may be determined as a simple arithmetic mean, a weighted mean, the median, the mode or some other type of mean function expressing the average of the gathered power parameter data for that group of data.

For a specific wind direction interval and the corresponding group of data the average wind power parameter is then compared to the estimated wind power parameter. The wind direction offset for that specific wind direction interval is then determined from this comparison. In one embodiment, the wind direction offset is for example found by taking the difference between the measured and expected relative wind directions yielding the same or a corresponding wind power parameter.

The determined wind direction offsets are advantageously used to adjust the wind direction parameter corresponding to an additional calibration of the wind direction sensor. The wind direction parameter is adjusted as a function of the wind direction offsets, such as by a simple subtraction, as a gain factor, by a linear function or some other functions. Likewise the adjustment may be performed by a PI or PID control.

The adjusted wind direction parameter may preferably be applied in determining a yaw parameter for the wind turbine and the controlling of the wind turbine then comprises yawing the wind turbine according to the yawing parameter. Hereby the yawing parameter of the turbine is based on more accurate wind direction data improving the control of the wind turbine.

The adjusted wind direction parameter may alternatively or additionally be applied in determining other control parameters which to some extend depends on the wind direction, such as a pitch parameter of one or more of the rotor blades, and/or a rotational speed of the rotor.

In an embodiment the wind direction offset of a wind direction interval is determined as the difference between an average wind direction parameter of the wind direction interval and an estimated wind direction parameter yielding an estimated wind power parameter corresponding to the average wind power parameter of the wind direction interval. In other words, the measured relative wind direction yielding the average wind power parameter is compared to the estimated relative wind direction yielding an estimated wind power parameter, and the offset is determined as the difference there between. An example of this is given in details in FIG. 3 in this case for the wind power parameter being determined as the wind turbine power. However, the principal is the same for other wind power parameters. Hereby is compensated for the error or inaccuracy of the relative wind direction measurement when the turbine is not pointing directly upwind and for the free wind flow having been changed by the rotor.

The proposed control method wherein the measured wind parameter is adjusted has been seen to yield a more robust and stable control method where the risk of unintentional increased or more or less abrupt switching between different yaw positions has been significantly reduced or even removed.

By the proposed method, the knowledge of or estimation on how the wind power parameter is expected to change when the relative wind direction changes is exploited to adjust the measured wind direction parameter. Hereby, the measurements of one or more wind direction sensors can be adjusted effectively and accurately by simple means and during operation. Further the offsets can be determined and re-determined as desired and preferably from time to time ensuring that the wind direction measurements are adjusted as accurately as possible.

In an embodiment, the method comprises calibrating the measured wind direction parameter as a function of a predetermined calibration parameter such that a calibrated measured wind direction parameter of 0 degrees corresponds to a relative wind direction of 0 degrees. Hereby, the wind direction offsets can be determined more accurately and the wind directions measurements adjusted correspondingly more accurately. The calibration parameter may in one embodiment be determined from the angle at which the histogram of the wind power parameter attains a peak value. For example, the wind turbine power should ideally attain a maximum at a relative wind direction of 0 degrees.

In this way, the wind direction parameter can be calibrated and adjusted by means of the same data by first calibrating to thereby yield a wind power parameter peak value at 0 degrees and secondly adjusting to yield a wind power parameter corresponding to an expected value.

In an embodiment of the invention, the wind direction parameter is adjusted as a function of the wind direction offset of the wind direction interval comprising the wind direction parameter at the time of adjusting. In this way the wind direction offset of one interval is simply applied to adjust all relative wind directions when lying within that interval.

In an embodiment of the invention, the wind direction parameter is adjusted by an interpolation function between the wind direction offsets of the different wind direction intervals. In this way the accuracy of the applied wind direction offset to adjust the measured wind direction parameter is further improved.

As also mentioned previously, in one embodiment the determining of a power comprises measuring a grid power or measuring or estimating a generator output power. The wind power parameter may hereby be easily obtained as the grid power which is normally a parameter already available.

In an embodiment, determining the blade load comprises determining a root moment of one or more of the wind turbine blades. The blade load may for example be expressed as average blade root moment. Alternatively or additionally, the blade load may be determined from measurements on one or more of the turbine blades by means of strain gauges or optical fiber sensors.

In an embodiment, the estimate for the wind turbine power and/or torque is expressed as $\cos^x$ to the relative wind direction, where x is a constant. This has been found to yield a simple yet fairly accurate estimate or fit for the wind turbine power as a function of the angle of the wind. The constant x may be in the range of 1-4, such as equal to 3. The constant x may depend on the wind turbine type.

In an embodiment, the method of controlling further comprises obtaining a number of pre-defined wind speed intervals and obtaining a group of data and a wind direction offset for each wind speed interval. The wind direction parameter may then be adjusted as a function of the wind direction offset of the wind speed interval comprising the wind speed at the time of adjusting. Alternatively, the wind direction parameter may be adjusted by an interpolation function between the wind direction offsets of the different wind speed intervals. Further, the method may comprise obtaining more estimates for the wind power parameter such as one estimate for each wind speed interval. The estimates may then be the same for some or all of the wind speed intervals, or may be different for all the wind speed intervals.

A number of wind power parameter histograms are then established, one for each of the predetermined wind speed intervals or bins. A set of wind direction offsets is then estimated for each histogram (i.e. a wind direction offset both for each wind speed interval and for all wind direction intervals) and the wind direction parameter is then adjusted based as a function of the set of wind direction offset parameters. Hereby is obtained a set of wind direction offsets corresponding to different wind speeds for thereby more accurately capturing how the wind direction sensor measurements are often seen to vary at different wind speeds where the rotor speeds and/or rotor configuration (for example pitch angles) are correspondingly varied. By determining and applying a number of wind direction offsets the wind direction can be determined more accurately.

The histograms for different wind speed intervals or wind speed bins may be determined individually for example over different time periods or in parallel. One set of wind direction offsets for one wind speed interval may be ready and applicable earlier than the others depending on the wind conditions.

Similarly, wind direction offsets may be determined for a number of pre-defined intervals of the wind power parameter as an alternative or addition to wind speed intervals. The advantages herby are the same as for the use of different wind speed intervals.

Similarly as for the wind direction intervals discussed above, the predetermined intervals for the wind speed and/or wind power parameter are preferably successive intervals but some may alternatively in an embodiment be partially overlapping. The intervals may be determined for example with a view to the dependency of the wind direction misalignment to the wind speed (and/or wind power parameter), such that smaller intervals are set in regimes where the wind direction correction changes more.

In an embodiment, 2, 3, or 4 different or additional groups of data sets are made based on data sets within 2, 3, or 4 wind speed (and/or wind power parameter) intervals, respectively. The more intervals the more refined the wind direction adjustment may be. The wind speed intervals may for example comprise the intervals of relatively low, medium, and high wind speeds such as from 0-6 m/s, 6-12 m/s, and 12-25 m/s.

In this way wind direction offsets may be determined for either of or both of different wind direction intervals and different wind speed intervals and/or wind power parameter.

By determining a wind direction offset for a number of wind speed and/or wind power parameter intervals is obtained a more precise method with improved accuracy better capturing that the wind direction is to be adjusted differently under different operating condition of the wind turbine and under different wind speeds.

The wind speed may be measured and/or estimated for example based on the power of the wind turbine.

In an embodiment, the steps of obtaining a group of data sets and determining a wind direction offset are repeated at time intervals. In this way the wind direction offset may be updated from time to time such as for example every 3 months or the like and/or when changes have been made to the wind turbine which could affect the wind flow near the wind direction sensor. Hereby, seasonal changes can be taken into account and/or the potential influence from for example the mounting or replacement of equipment on the nacelle. Additionally or alternatively, the steps of obtaining a group of data sets and determining a wind direction offset may be repeated for a defined time period only.

In an embodiment, the steps of obtaining a group of data sets and determining a wind direction offset are repeated a predefined number of times such as for example 2-5 times. Hereby, the wind direction offset can be determined with greater certainty.

In an embodiment, the adjusting of the wind direction parameter comprises subtracting or multiplying the wind direction offset times a gain factor smaller than one, wherein the gain factor is in the interval of 0.1-0.95, such as in the interval of 0.4-0.6, such as equal to 0.5. Hereby too abrupt changes to the yawing are avoided and an improved convergence may be obtained.

In yet a further embodiment of the invention, the wind direction parameter is further adjusted as a function of earlier wind direction offsets, whereby abrupt changes to the wind direction parameter may be avoided and whereby switching back and forth between values may likewise be avoided. For example, the wind direction parameter may be adjusted by a subtraction of the wind direction offset, and further a subtraction of the change in wind direction offset from the last to the present adjustment and times a gain factor.

In a further aspect the present invention relates to a control system for a wind turbine comprising at least one wind direction sensor for measuring a wind direction parameter indicative of the wind direction relative to the wind turbine, a number of pitch-adjustable rotor blades, and a yawing system, the control system being configured for yawing the wind turbine rotor relative to the wind and for changing the pitch of the rotor blades and/or a generator torque, and where the control system is configured to perform the steps of:
- receiving an estimate for a wind power parameter as a function of a relative wind direction, where the wind power parameter is determined as one of a power, a torque, a blade load, or a blade pitch angle of the wind turbine;
- receiving a number of pre-defined wind direction intervals;
- receiving at time intervals a data set comprising a wind power parameter and a wind direction parameter as measured by the wind direction sensor;
- obtaining over time a group of data sets for each wind direction interval;
- determining for each wind direction interval and for each group of data sets an average wind power parameter;
- determining for each wind direction interval and for each group of data sets a wind direction offset by comparing the average wind power parameter with the estimate of the wind power parameter;
- adjusting the wind direction parameter as a function of the wind direction offsets of the different wind direction intervals, and
- applying the adjusted wind direction parameter in the controlling of the wind turbine.

In a further aspect the present invention relates to a wind turbine comprising a wind sensor, a yawing system, and a control system according to the above.

The advantages of the control system and the wind turbine comprising such control system are as described hereinabove in relation to the control method and features described in relation to the control method apply to the wind turbine and control system.

BRIEF DESCRIPTION OF THE DRAWINGS

In the following different embodiments of the invention will be described with reference to the drawings, wherein.

DETAILED DESCRIPTION OF THE DRAWINGS

Figure 1:
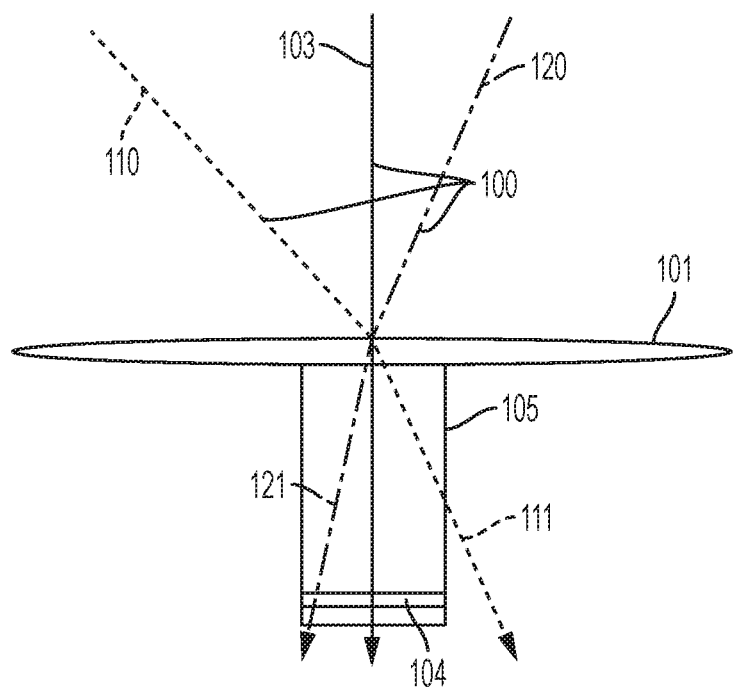
FIG. 1 illustrates the change in wind direction when the free flow passes through a wind turbine rotor.

FIG. 1 illustrates the change in wind direction when the free flow 100 passes through a wind turbine rotor 101. If the rotor 101 is turned directly in to the wind as illustrated by the solid black line 103, a wind direction sensor 104 positioned on the nacelle 105 behind the rotor 101 when calibrated will measure a wind direction of 0 degrees. However, if the wind is not directly upwind, the wind flow 100 is affected by the rotor 101 and is affected differently depending on the direction of the incoming wind. Therefore, the wind sensor 104 may detect the wind direction inaccurately. The figure illustrates how an incoming wind at approximately 45 degrees, 110, may be measured as being only 30 degrees, 111, even though the wind sensor has been calibrated. Similarly, an incoming wind of approximately −20 degrees, 120, may be measured as being approximately −10 degrees, 121.

As mentioned above, the wind direction sensors 104 are generally calibrated for example by sets of predetermined calibration parameters such that the sensors yield a calibrated relative wind direction of 0 degrees when the rotor is turned directly upwind. The way the wind turbine rotor affects the wind flow depends on the type of wind turbine rotor.

However, it has been observed that the calibrated wind sensor shows an error in its relative wind direction measurements when the wind turbine is not pointing directly upwind. In many cases the wind sensors have been found to yield relative wind directions smaller than the actual relative wind direction (such as illustrated in FIG. 1). In such cases, the inaccuracy of the wind sensor reported here may not be noticed as this could result in the wind turbine being yawed less than optimal and the wind turbine needing more yawing steps to be turned into the wind. It can however also result in, that a bigger yaw error is required before starting yawing upwind, and even worse that an extreme yaw error event may not be detected. For instance if the wind is suddenly changing 30 degrees some pitching of the blades is needed to minimize the loads. But if only 20 degrees are measured, the load reduction activities would not be initiated on the event.

In some case and for some rotor types, the rotor has been seen to affect the wind flow in such a way that the wind sensors yield relative wind directions larger than the actual relative wind direction. This may however be critical to the controlling of the wind turbine and lead to critical loads and wear especially on the yawing system, as the control system may then tend to yaw the rotor too much and causing the rotor to be yawed back and forth without obtaining the desired yaw direction of the rotor pointing directly into the wind.

Figure 2:
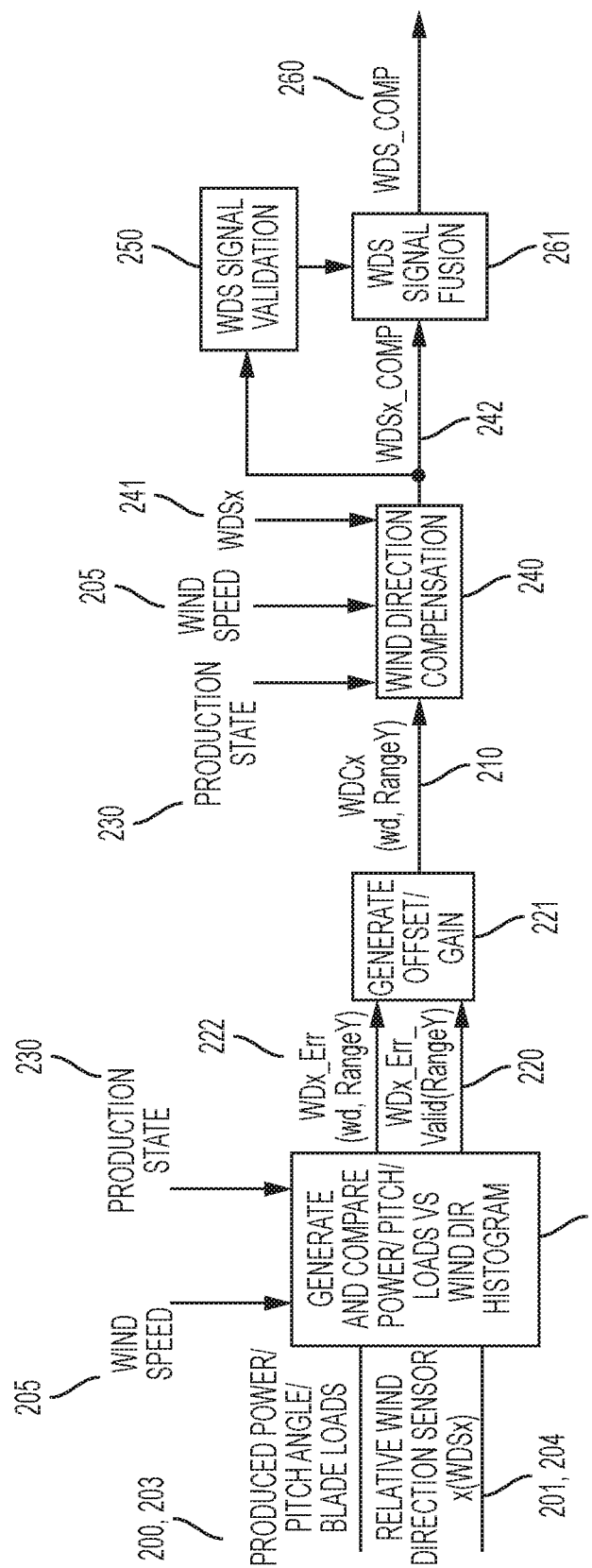
FIG. 2 illustrates the functionality of the control method according to an embodiment of the invention.
Figure 4:
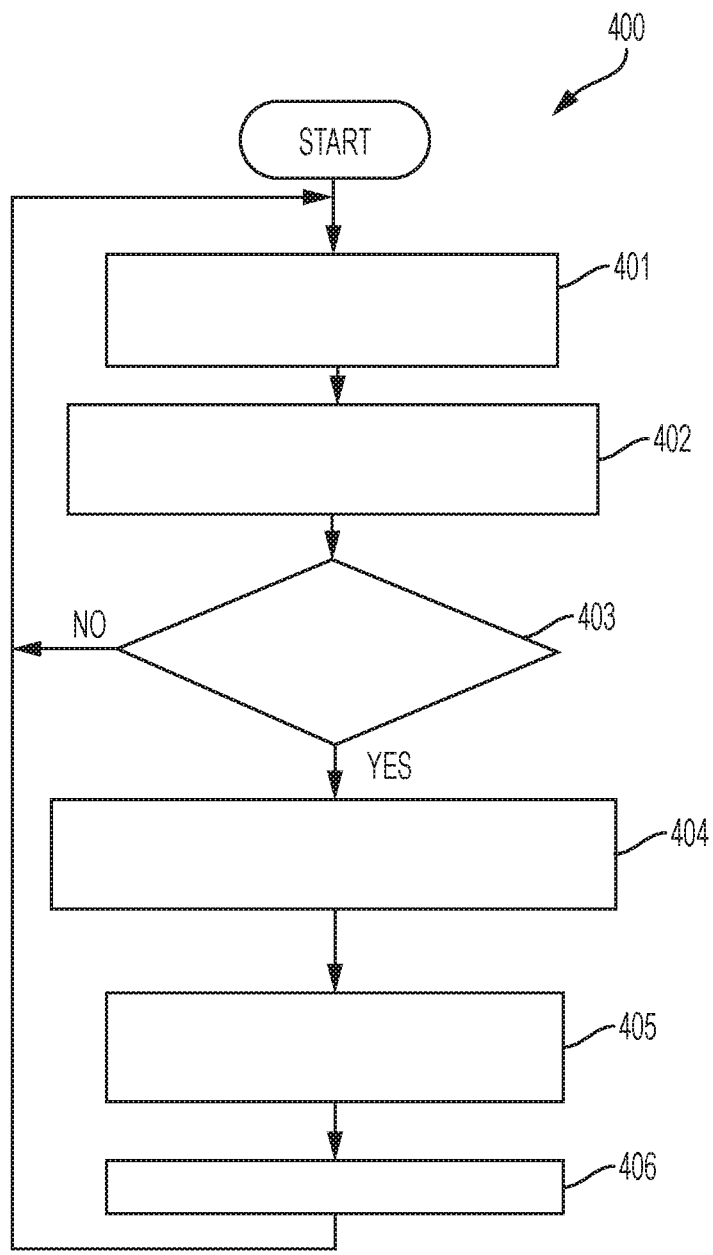
FIG. 4 is a flow chart illustrating an embodiment of the invention.

This inaccuracy of the wind sensor measurements is removed or at least reduced by the method according to the invention by adjusting the already calibrated relative wind direction by wind direction offsets which are determined according to the method as illustrated in FIG. 2 and in the flow chart of FIG. 4. Hereby is obtained a calibrated and adjusted relative wind direction, which is then used in the control of the wind turbine. The proposed method of adjusting the sensor measurements is furthermore advantageous in that it can be performed adaptively and automatically over time.

An overview of the functionality of the control method is shown in FIG. 2.

Figure 3:
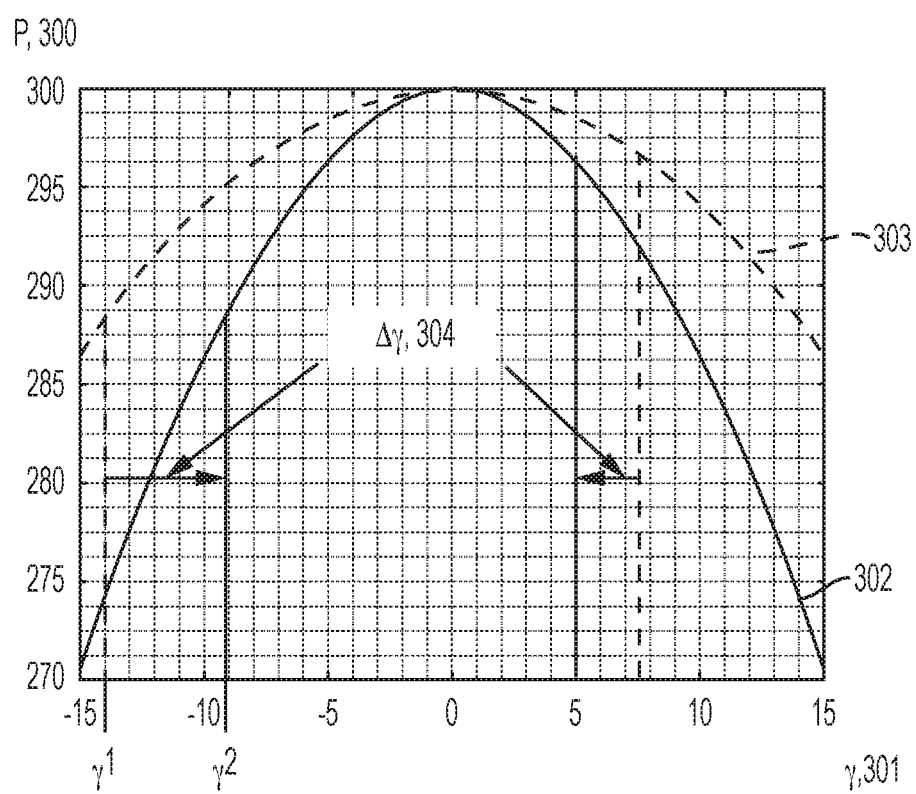
FIG. 3 illustrates an example of comparison of a histogram established over time to an estimate of a wind power parameter.

The basic idea is to make a histogram of the produced wind power parameter as a function of the measured relative wind direction and compare it to how the histogram is expected or estimated to look like. This is illustrated in FIG. 3. The wind power parameter may be the wind turbine power, or torque or a blade loads.

As an example, the wind turbine power P, 300 of a given turbine may be known or estimated to follow a given function like for instance a $\cos^3$ of the relative wind direction y, 301 as illustrated as the solid line 302 in FIG. 3. Then is generated a histogram of the power P, 300 as a function of the measured relative wind direction on a turbine, which then may look like the dotted line, 303 in FIG. 3. From the generated histogram 303 it can be seen that at a measured wind direction of −14°, y1, the wind turbine power is reduced by 4% (from 300 down to 288). However, from the expected or estimated histogram 302 such power loss of 4% is expected already at a relative wind direction of −9°, y2. This means that a measured relative wind direction of −14° should be adjusted by a wind direction offset of 5°, Δy, 304, to get the correct relative wind direction of −9°, y2. Alternatively, the wind direction parameter could be adjusted by a gain of approximately 0.64. This comparison between obtained and estimated wind power parameter to determine wind direction offsets is performed at different measured relative wind directions.

The use of the wind turbine power as the wind power parameter according to this method is especially effective in partial load production, i.e. at a power below or up to the nominal power. In full load production, the blade pitch angle or blade loads can be used instead of the wind turbine power.

Referring to FIG. 2, the relative wind direction parameter 201 indicative of the wind direction relative to the wind turbine and from each wind sensor x is continuously measured and filtered to reduce the effect of a passing blade in front of the sensor. A histogram of the wind power parameter (power, pitch angle and/or blade load) vs measured relative wind direction is generated, 202. When a certain amount of data has been obtained to yield a clear histogram, the loss in wind power parameter at a measured relative wind directions will be compared with the estimated or expected relative wind direction at that power loss, 202. The wind direction errors, 222 are then determined as the difference between the measured and the expected relative wind direction from which the wind direction offsets, 210, are generated, 221, like illustrated in FIG. 2.

The wind direction offsets 210 can be different for different measured wind direction parameter 201 (different wind direction intervals) and also for different wind speeds, 205, and can additionally or alternatively be depending on the produced power and/or on the production state of the turbine, 230. This means that a given relative wind direction may be adjusted with one offset at low wind speed or power, and with another at high wind speed or power. As another example, there could be one set of wind direction offsets for partial load production and another for full load production. As an example, the relative wind direction can be divided into intervals like for instance from −15 to +15 degrees with step of 3 degrees, and each of these bins could additionally be divided into different wind speed intervals like for instance from 3-12 m/s and 12-25 m/s.

The number of data sets in each group or bin (i.e. for each wind direction interval and optionally wind speed or power interval) is stored. When the number of data sets in one or more of the bins at a given wind speed/power interval (RangeY) reach a predetermined threshold value, the signal "WDx_Err_Valid(RangeY)" for that interval is sat and the wind direction offset, 210, for that group of data can then be determined in the "Generate offset/gain" block 221, based on the "WDx_Err(wd, RangeY)" signal, 222, being the difference between the measured and the expected relative wind direction at a given wind power parameter loss for all the wind directions in the interval.

In the "Generate offset/gain" block, 221 a controller generates a Wind Direction offset "WDCx(wd, ws)", 210 for the given wind direction and wind speed interval. This wind direction offset can for instance be the "WDx_Err(wd, ws)" for the given interval(s) times a gain factor (for example in the range of 0.2-1.0). When a wind direction offset is generated for a given wind direction interval and/or wind speed interval, the "WDx_Err_Valid(wd, ws)" and "WDx_Err(wd, ws)" signals for that interval(s) are cleared. The number of data sets for the given group is also cleared and the collection of data sets for that group can start over again.

In the "Wind Direction Compensation" block, 240 in FIG. 2 the wind direction signals "WDSx", 241 from the one or more wind direction sensors are adjusted or compensated "WDSx_Comp", 242 based on the wind direction offset "WDCx", 210 for the current measured wind speed, 205 and for the measured wind direction "WDSx", 241 (which determine the relevant wind direction offset from among the wind direction offsets for the different wind direction and wind speed intervals). This is done for each wind direction sensor "x". The compensation can be performed based on an interpolation between the wind direction offsets for the different wind speed intervals to obtain a more smooth adjustment.

Based on a validation "WDS Signal Validation", 250 of each of the adjusted "WDSx_Comp" signals 242 for the number of wind direction sensors, the adjusted signals will be fused to a single wind direction signal "WDS_Comp" 260 in the "WDS Signal Fusion" block, 261.

This is also illustrated in the flowchart diagram for the process to generate the wind direction offset for a given wind direction sensor x and as performed in a control system, 400, of a wind turbine according to the invention as shown in FIG. 4.

For each wind direction sensor, data sets are obtained, 401, comprising the measured relative wind direction and a wind power parameter which can be one of a produced power, a torque or a blade load of the wind turbine. Further, over time groups of data are obtained, 402, to thereby generate a histogram of the wind power parameter versus the relative wind direction. The histogram may be established as the average wind power parameter for a number of predefined wind direction intervals. The number of samples (i.e. data sets) for each wind direction interval and in total is stored. When a certain number of data for the wind direction sensor is obtained, 403, the average wind power parameter as measured for a given wind direction interval is then compared to the wind direction expected to or estimated to yield the same wind power parameter, 404. From this comparison is determined, 405, a wind direction offset for each wind direction interval. The wind direction offsets are then used to adjust the wind direction measurements preferably times some gain factor to make the adjustment more robust. The group of data sets for the given wind direction interval is then cleared, 406, and optionally ready for a redetermination of a wind direction offset.

The data sets can further be grouped or binned for example according to different wind speed or wind turbine power intervals. A set of wind direction offsets are then determined for each wind speed or wind turbine power interval.

Figure 5:
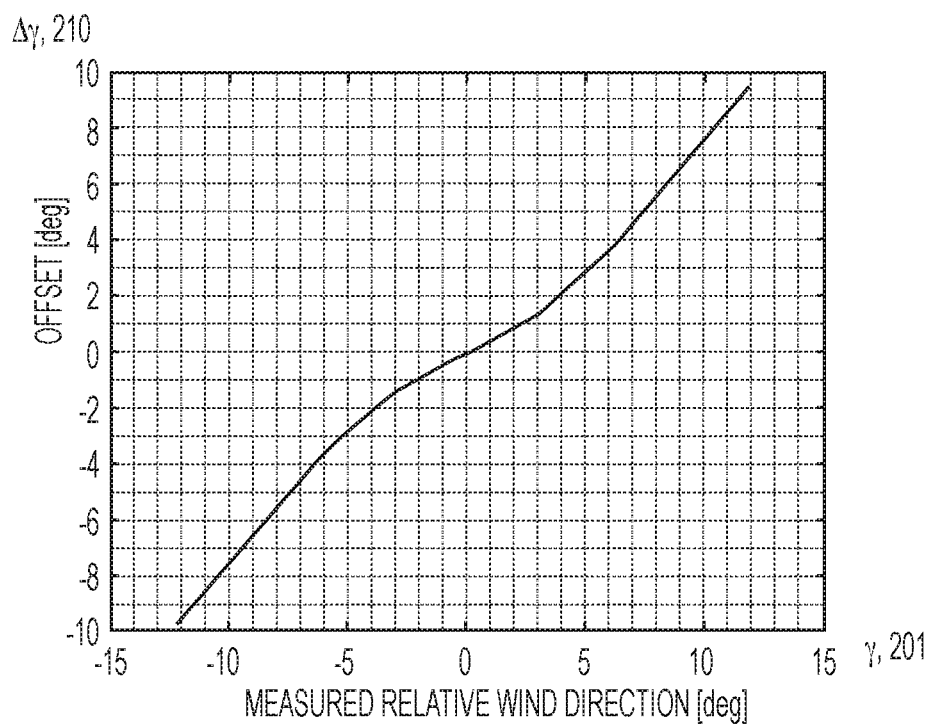
FIG. 5 shows an example of wind direction offset for different wind directions according to embodiments of the invention.

FIG. 5 shows the wind direction offsets 210 determined according to an embodiment of the invention and as a function of the relative wind direction measured by a wind direction sensor, 201. A number of wind direction offsets have here been determined for a number of different wind direction intervals and then interpolated in between. It is noted that the wind direction offset is 0 degrees for a measured wind direction of 0 degrees, corresponding to the wind direction sensor having been calibrated to correctly detect an incoming wind of 0 degrees. However, the figure clearly illustrate that the wind direction sensor does not measure the wind at other angles correctly as the determined wind direction offsets are relatively significant.

Figure 6:
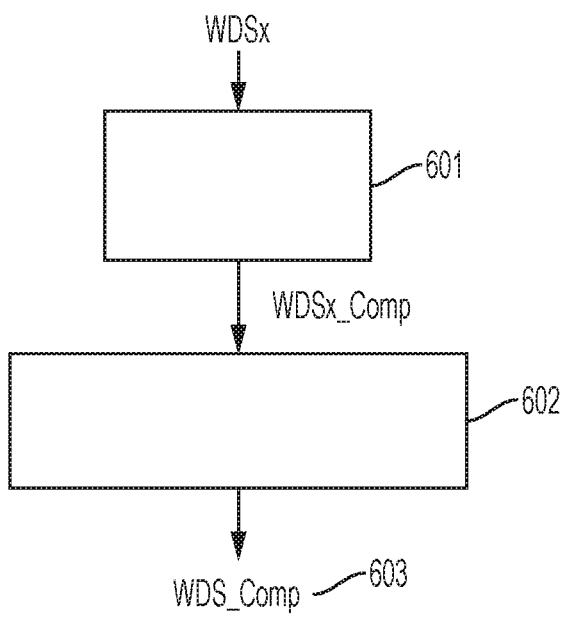
FIG. 6 illustrates a compensation and fusion of the wind direction signals from different sensors.

Often, several wind direction sensors are used on a wind turbine. In that case the wind direction measurements from each sensor 800 may be corrected individually by different sets of wind direction offsets, and the adjusted relative wind direction from each sensor then fused to yield a common final corrected relative wind direction to be applied in the control system of the wind turbine. FIG. 6 is a flowchart illustrating an adjusting and fusion of the wind direction signals from different sensors. The wind direction signal for a sensor x is first compensated based on the wind direction offset for the relevant wind direction interval and wind speed interval based on the current relative wind direction and optionally wind speed (or power), 601. The hereby adjusted wind direction signals from each of the different wind direction sensors are then fused, 602, to a single relative wind direction signal, 603. This may for example be performed based on a simple averaging and/or based on the current quality of each of the wind direction sensors. For example, some sensors may be known to perform poorly at very low temperatures and are therefore disregarded in the fusing when the temperature is low. Fault detection and fault diagnosis may be performed of each of the sensors, and the more failures or abnormal behaviour a sensor show, the lower it will be weighted in the sensor fusion. In the event that both sensors show abnormal behaviour, the fusion may start to take into account previous sensor results as well.

While embodiments of the invention have been shown and described, it will be understood that such embodiments are described by way of example only and it will be appreciated that features of different embodiments may be combined with one another in any combination. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method of controlling a wind turbine, the wind turbine comprising at least one wind direction sensor for measuring a wind direction relative to the wind turbine, a number of pitch-adjustable rotor blades, a yawing system, and a control system for yawing a rotor of the wind turbine relative to the wind and for changing the pitch of the rotor blades and/or a generator torque, the method comprising:
   receiving, for a first wind direction interval of a plurality of wind direction intervals, a power that the wind turbine is expected to produce for the first wind direction interval;
   receiving measured power produced by the wind turbine at relative wind directions that fall within a second wind direction interval of the plurality of wind direction intervals, the second wind direction interval is different from the first wind direction interval;
   determining an average power produced by the wind turbine for the second wind direction interval by averaging the measured power produced by the wind turbine at the relative wind directions that fall within the second wind direction interval;
   upon determining that the average power produced by the wind turbine for the second wind direction interval is equal to the power that the wind turbine is expected to produce for the first wind direction interval, determining a difference between the first wind direction interval and the second wind direction interval;
   receiving a wind direction measured by the wind direction sensor;
   upon determining that the wind direction falls within the second wind direction interval, adjusting the wind direction based on the determined difference; and
   applying the adjusted wind direction in the controlling of the wind turbine.

2. The method of controlling according to claim 1, further comprising calibrating the wind direction measured by the wind direction sensor as a function of a predetermined calibration parameter such that a calibrated measured wind direction of 0 degrees corresponds to a relative wind direction of 0 degrees.

3. The method of controlling according to claim 1, wherein the wind direction measured by the wind direction sensor is adjusted by an interpolation function between determined differences of different wind direction intervals.

4. The method of controlling according to claim 1, wherein the power produced by the wind turbine is determined by measuring a grid power or estimating a generator output power.

5. The method of controlling according to claim 1, further comprising determining a blade load by determining a root moment of one or more of the rotor blades.

6. The method of controlling according to claim 1, wherein the power that the wind turbine is expected to produce for the first wind direction interval is estimated based on a $\cos^x$ function of the first wind direction interval, wherein x is a constant.

7. The method of controlling according to claim 1, further comprising obtaining a number of pre-defined wind speed intervals and obtaining a group of data sets and a second difference for each wind speed interval.

8. The method of controlling according to claim 7, wherein the wind direction measured by the wind direction sensor is adjusted as a function of the respective second difference of the respective wind speed interval comprising a wind speed at a time of adjusting.

9. The method of controlling according to claim 7, where the group of data sets is determined over a predetermined time period.

10. The method of controlling according to claim 7, where the group of data sets is determined based on a predetermined number of data sets in the group of data sets.

11. The method of controlling according to claim 7, where the steps of obtaining the group of data sets and determining the respective second differences are repeated at time intervals.

12. The method of controlling according to claim 1, where adjusting the wind direction measured by the wind direction sensor comprises subtracting the difference times a gain factor smaller than one.

13. A control system for a wind turbine comprising at least one wind direction sensor for measuring a wind direction relative to the wind turbine, a number of pitch-adjustable rotor blades, and a yawing system, the control system being configured for yawing a rotor of the wind turbine relative to the wind and for changing the pitch of the rotor blades and/or a generator torque, and where the control system is configured to perform the steps of:
receiving, for a first wind direction interval of a plurality of wind direction intervals, a power that the wind turbine is expected to produce for the first wind direction interval;
receiving measured power produced by the wind turbine at relative wind directions that fall within a second wind direction interval of the plurality of wind direction intervals, the second wind direction interval is different from the first wind direction interval;
determining an average power produced by the wind turbine for the second wind direction interval by averaging the measured power produced by the wind turbine at the relative wind directions that fall within the second wind direction interval;
upon determining that the average power produced by the wind turbine for the second wind direction interval is equal to the power that the wind turbine is expected to produce for the first wind direction interval, determining a difference between the first wind direction interval and the second wind direction interval
receiving a wind direction measured by the wind direction sensor;
upon determining that the wind direction falls within the second wind direction interval, adjusting the wind direction based on the determined difference; and
applying the adjusted wind direction in controlling the wind turbine.

14. A wind turbine, comprising:
a tower;
a nacelle disposed on the tower;
a rotor extending from the nacelle;
a plurality of blades disposed on the rotor;
one or more actuators mechanically coupled to the plurality of blades and configured to control a respective pitch of the plurality of blades;
a wind direction sensor configured to measure a wind direction relative to the wind turbine;
a yawing system configured to yaw a rotor of the wind turbine relative to the wind direction; and
a control system configured to issue commands to the yawing system and the one or more actuators, and where the control system is configured to perform an operation comprising:
receiving, for a first wind direction interval of a plurality of wind direction intervals, a power that the wind turbine is expected to produce for the first wind direction interval;
receiving measured power produced by the wind turbine at relative wind directions that fall within a second wind direction interval of the plurality of wind direction intervals, the second wind direction interval is different from the first wind direction interval;
determining an average power produced by the wind turbine for the second wind direction interval by averaging the measured power produced by the wind turbine at the relative wind directions that fall within the second wind direction interval;
upon determining that the average power produced by the wind turbine for the second wind direction interval is equal to the power that the wind turbine is expected to produce for the first wind direction interval, determining a difference between the first wind direction interval and the second wind direction interval;
receiving a wind direction measured by the wind direction sensor;
upon determining that the wind direction falls within the second wind direction interval, adjusting the wind direction based on the determined difference; and
applying the adjusted wind direction in the controlling of the wind turbine.

* * * * *